United States Patent Office 3,278,642
Patented Oct. 11, 1966

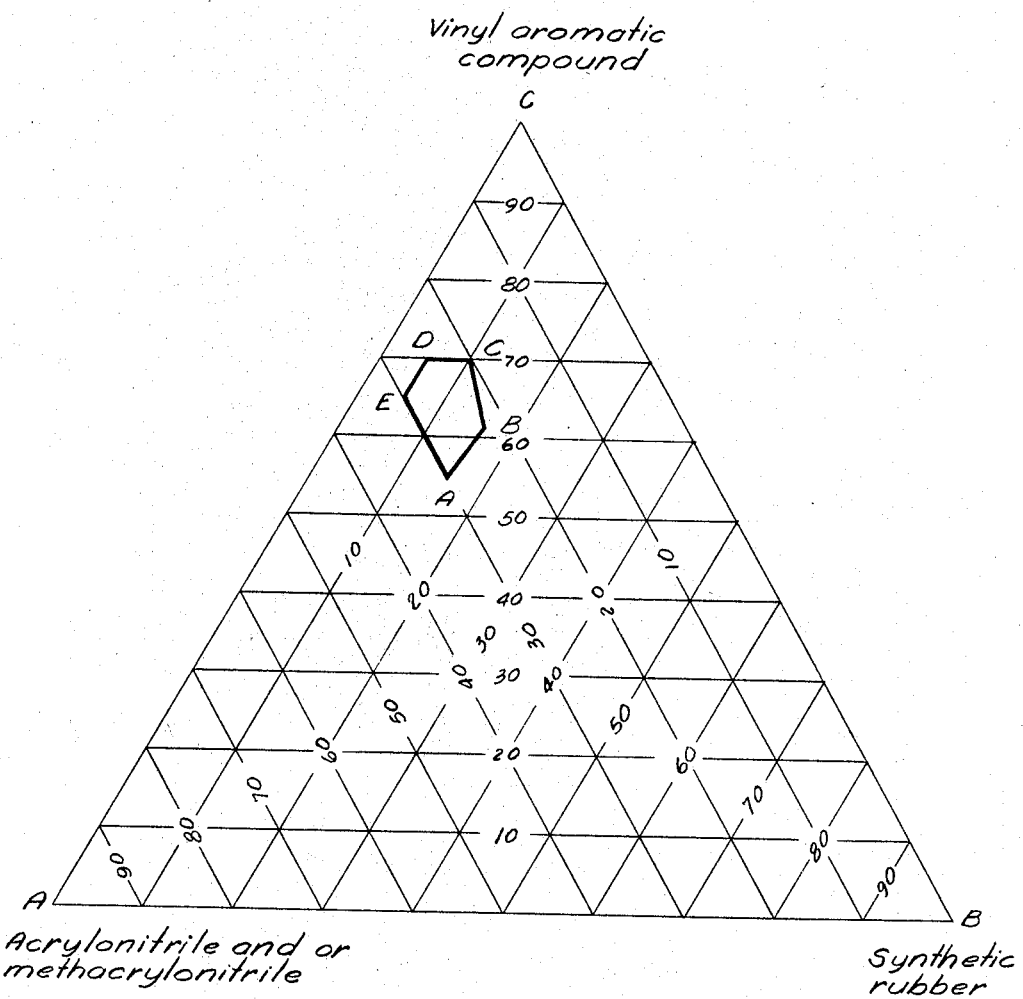

3,278,642
METHOD OF MAKING INTERPOLYMERS OF MONOVINYL AROMATIC COMPOUNDS, ACRYLONITRILE AND A RUBBER
Lieng-Huang Lee, Midland, Mich., assignor to The Dow Chemical Company, Midland, Mich., a corporation of Delaware
Filed Dec. 26, 1962, Ser. No. 247,192
8 Claims. (Cl. 260—880)

This invention concerns certain new polymeric compositions comprising an interpolymer or graft copolymer of one or more monovinyl aromatic compounds, acrylonitrile and/or methacrylonitrile and an elastomeric or rubbery butadiene polymer and pertains to a method of making the polymeric products.

It is known to prepare tough shock resistant plastic compositions by blending one or more normally hard copolymers of styrene and acrylonitrile with one or more relatively elastomeric or rubbery butadiene polymers, e.g. copolymers of butadiene, or graft copolymers of styrene and/or acrylonitrile on polybutadiene.

Although the heretofore known polymeric compositions are useful for a variety of purposes in the home and industry they have not been entirely satisfactory for many purposes because of deficiencies in one or more of their properties such as gloss or smoothness of an extruded or molded surface, color, elongation, or resistance to attack by solvents or cleaning solutions, e.g. soap or detergent solutions. There is continued search for plastic compositions possessing good mechanical properties such as tensile strength, impact strength, elongation, and high heat distortion temperature, which compositions are thermoplastic and can be shaped by usual compression or injection molding procedures or by extrusion methods to form articles having a high gloss or smooth surface, good color and a high resistance to attack or swelling by organic solvents.

It has now been discovered that thermoplastic polymer compositions comprising interpolymers or graft copolymers of one or more monovinyl aromatic compounds, and acrylonitrile upon an elastomeric butadiene polymer such as polybutadiene, rubbery copolymers of butadiene and styrene, rubbery copolymers of butadiene and acrylonitrile, rubbery copolymers of butadiene, styrene and methyl isopropenyl ketone, and particularly stereospecific butadiene polymers such as polybutadiene or elastomeric copolymers of a major proportion by weight of butadiene and a minor proportion of a monoethylenically unsaturated monomer, e.g. styrene, vinyltoluene, or methyl isopropenyl ketone, polymerized in the presence of, or in contact with, a stereospecific catalyst such as butyl lithium, aluminum alkyls, or mixtures of aluminum alkyls and titanium trichloride or titanium tetrachloride, to form polymers containing a high proportion, e.g. 30 percent or more, of butadiene chemically combined in the cis-1,4-configuration with not more than about 70 percent of the polymer having a trans-1,4-configuration.

The interpolymers or graft copolymers of the invention can readily be prepared by a procedure which comprises: (a) forming a solution of the rubber dissolved in the monomers in the desired proportions; (b) partially polymerizing or prepolymerizing the solution in mass, while at the same time agitating the mass with a shearing agitation, sufficient to prevent cross-linking and maintain the polymer and the polymer being formed therein, dispersed in the mass as particles of sizes not substantially greater than five microns, and until the solution contains from about 25 to 50, preferably from 25 to 35, percent by weight of solids, including the rubber or polymer in the solution starting material; and (c) completing or substantially completing polymerization of the remaining monomers by heating the partially polymerized solution at elevated temperatures while suspended as droplets in an inert aqueous medium, as more fully hereinafter described.

It is important that the butadiene rubber be soluble in the monomers, e.g. in monomeric styrene, to form a starting solution free or substantially free from gels, and that polymerization of the monomers be carried out according to the procedural steps of (b) and (c) above, in order to obtain polymeric compositions possessing the improved properties resulting from the invention.

More specifically, it is important that the initial polymerizing or prepolymerizing of the solution of the monomers and the butadiene rubber be carried out in mass, and with shearing agitation in the mass of the material, sufficient to maintain the interpolymer uniformly dispersed throughout in the form of fine particles of sizes not greater than 5 microns, preferably three microns or smaller, until the solution contains from 25 to 50, preferably from 25 to 35, percent by weight of solids, and such that the prepolymerized solution is a stable dispersion of the finely divided polymer which does not separate upon standing quiescent at room temperature and atmospheric pressure for a period of at least 24 hours.

It is also important that the completing or the substantial completing of the polymerization of the remaining monomers in admixture with the finely divided prepolymer dispersed therein be carried out in an inert aqueous suspending medium in order to obtain polymeric compositions possessing the improvements in their physical and mechanical properties resulting from the invention. Such method avoids overheating of the polymer and/or monomers during the final or last stages of polymerization and produces advantageous results.

The monomers to be employed are monovinyl aromatic compounds of the benzene series having the vinyl radical directly attached to a carbon atom of the aromatic nucleus, including alkaryl and haloaryl monomers. Among suitable monovinyl aromatic compounds are styrene, vinyltoluene, vinylxylene, isopropylstyrene, ar-ethylvinylbenzene, tert.-butylstyrene, chlorostyrene, dichlorostyrene, fluorostyrene, bromostyrene, chlorovinyltoluene ar-chloro-ar-ethylvinylbenzene and mixtures of any two or more of such monovinyl aromatic compounds. The monovinyl aromatic compound can be replaced with up to 25 percent by weight of a vinylidene aromatic compound such as alpha-methylstyrene, alpha-ethylstyrene, para-methyl-alpha-methylstyrene or ar-chloro-alpha-methylstyrene. The monovinyl aromatic compound can be used in amounts corresponding to from 55 to 70 percent by weight of the solution of the starting materials, and within the area defined by the lines ABCDE of the drawing. As previously mentioned as much as 25 percent by weight of the monovinyl aromatic compound can be replaced with a vinylidene aromatic compound selected from the group consisting of alpha-methylstyrene, alpha-ethylstyrene, para-methyl-alpha-methylstyrene and ar-chloro-alpha-methylstyrene.

More specifically, the aromatic monomers can be an alkenyl aromatic compound having the general formula Ar—CH=CH$_2$ wherein Ar represents an aromatic radical selected from the group consisting of hydrocarbon and nuclear substituted halohydrocarbon radicals of the benzene series with the proviso that at least 75 percent by weight of the alkenyl aromatic compound is a monovinyl aromatic compound having the general formula Ar—CH=CH$_2$ wherein Ar has the meaning given above and not more than 25 percent of the alkenyl aromatic compound is a compound of the above formula wherein R is an alkyl radical containing from 1 to 2 carbon atoms.

The acrylonitrile, methacrylonitrile, or a mixture thereof, can be used in amount corresponding to from 20 to 30, preferably from about 21.5 to about 28, percent by weight of the solution of the starting materials and within the area defined by the lines ABCDE of the drawing.

The rubbery or elastomeric butadiene polymer can be polybutadiene, a copolymer of butadiene and styrene, a copolymer of butadiene and acrylonitrile, a copolymer of butadiene, styrene and methyl isopropenyl ketone, with the proviso that the butadiene polymer contain a major proportion by weight, preferably from 60 to 100 percent by weight of chemically combined butadiene, and is soluble in the monomers, e.g. styrene. The butadiene polymer is preferably a stereospecific butadiene polymer such as polybutadiene or a copolymer of butadiene and styrene or vinyltoluene consisting principally of 1,4-addition polymer with a relatively small amount, e.g. 10 percent by weight or less, if any, 1,2-addition or vinyl polymer, and with a high proportion, e.g. 30 percent or more of the butadiene chemically combined in the cis-1,4-configuration. The stereospecific polybutadiene polymer can consist of about 30 percent of cis-1,4-addition polymer or substantially of all, e.g. 90 percent or more, of cis-1,4-polymer or it may consist of as much as 70 percent of trans-1,4-addition polymer and may be of narrow or of broad molecular weight distribution. Such elastomeric butadiene polymers or synthetic rubbers, including the stereospecific polybutadiene rubbers and stereospecific copolymers of butadiene and styrene, and methods of making the same are well known in the art and such synthetic butadiene rubbers are available on the open market. The butadiene polymers preferably have a Mooney number ML(1+4) 212° F. of from about 10 to 60, and are employed in amounts corresponding to from about 5 to 16, preferably from 7 to 15, percent by weight of the solution of the starting materials and within the area defined by the lines ABCDE of the drawing.

In practice, a solution is prepared by dissolving the butadiene rubber in the monomers in the desired proportions by stirring or other suitable means. The starting solution is preferably prepared by first dissolving the butadiene polymer in monomeric styrene by stirring at room temperature or thereabout, then adding thereto the desired amount of acrylonitrile and/or methacrylonitrile, and vinylidene aromatic compound, e.g. alpha-methylstyrene, if such latter aromatic compound is also used, to bring the starting solution to the desired proportions of monomers and rubbery butadiene polymer starting materials. It may be mentioned that small amounts of antioxidants can advantageously be added to the solution to prevent or inhibit oxidation of the rubbery butadiene polymer prior to carrying out the polymerization, with the proviso that the antioxidants have little, or no, inhibiting action on the polymerization and are used in the small amounts which do not appreciably affect the rate of polymerization. Examples of suitable antioxidants are hydroquinone, tert.-butylcatechol and di-tert.-butyl-4-methylphenol. They are usually employed in amounts of from 5 to 15 parts by weight of the antioxidant per million parts by weight of the butadiene rubber or polymer, but are not required in the invention.

The starting solution of the monomers and rubbery butadiene polymer is partially polymerized by heating the same in mass or in bulk, while at the same time agitating or stirring the mass with a shearing action which maintains the polymer i.e. the butadiene polymer, and the polymer being formed, dispersed in the polymerizing mass of the material in the form of fine particles of sizes not exceeding about five microns, preferably smaller than three microns, until the mass contains from about 25 to 50, preferably from 25 to 35, percent by weight of solids. The partial or prepolymerization can be carried out at temperatures between 60° and 150° C., preferably from 80° to 120° C., and at atmospheric, subatmospheric or superatmospheric pressures. The polymerization is preferably carried out in the absence of air or oxygen, or with only limited access of air such as by way of air through a reflux condenser, to the reacting mass. The polymerization can be initiated with peroxy compounds such as acetyl peroxide, benzoyl peroxide, di-tert.-butyl peroxide, tert.-butyl hydroperoxide, di-cumyl peroxide, cumene hydroperoxide, tert.-butyl peracetate, tert.-butyl perbenzoate or di-tert.-butyl diperphthalate, but such polymerization initiators are not required.

The partially polymerized solution is a stable dispersion of polymer in the desired particle size, i.e. of substantially uniform polymer particles of sizes not greater than five microns, uniformly dispersed in the remaining monomers. It does not readily separate into two phases or become non-uniform in compositions upon standing at ordinary conditions for 24 hours or longer. Thus, the prepolymerized solution can be stored for reasonable periods of time and can subsequently be heated at elevated temperatures and pressures in an inert aqueous suspension as herinafter described to complete or substantially complete the polymerization of the remaining monomers and produce the new composition of the invention.

The partially polymerized solution containing polymer in the form of fine particles not exceeding five microns in size is further polymerized by heating the same at temperatures between 80° and 180° C. while suspended as droplets in an inert aqueous medium at superatmospheric pressures at least as great as the autogeneous pressure of the mixture, e.g. by heating the same in a closed vessel, preferably in the absence or substantial absence of air or oxygen. Higher pressures may be used such as by pressurizing the vessel containing the aqueous suspension with an inert gas, e.g. nitrogen, methane, helium or urgon, suitably at from 5 to 100 pounds per square inch gauge pressure or higher, prior to heating the materials to complete the polymerization.

The suspending or dispersing agent can be any of a variety of water soluble dispersing agents known to the art, such as alkali salts of sulfonate polystyrene or sulfonated polyvinyltoluene, polyacrylic acid, polyacrylamide, methyl cellulose, hydroxy ethyl cellulose, water soluble interpolymers of acrylic acid or methacrylic acid and 2-ethylhexylmethacrylate, or carboxymethyl methyl cellulose. The alkali metal salts, e.g. the sodium or potassium salts, or carboxymethyl methyl cellulose such as cellulose derivative having an average of about 0.25 —OCH$_2$COOH group and about 1.8 OCH$_3$ groups per mole of cellulose, is preferred and is advantageously employed as the dispersing agent in carrying out the aqueous suspension polymerization, since the alkali salts of such cellulose derivative do not tend to gel upon heating at elevated temperatures. The carboxymethyl methyl cellulose or alkali salt thereof should have a viscosity of from about 1000 to 3000 centipoises as determined for a 2 weight percent solution of the material in water at 25° C. The material can be used in amounts corresponding to from about 0.2 to 5, preferably from 0.25 to 2.5 percent by weight of the water used.

In general, an amount of the aqueous medium corresponding to from one to two times the volume or weight of the preploymerized solution starting material is usually employed, although smaller or larger quantities of the aqueous can be used.

After completing or substantially completing polymerization of the monomers the polymer is recovered in usual ways, e.g. it is separated by filtering and is washed with water and dried. In a preferred embodiment the polymer is devolatilized by feeding the same to a plastics extruder wherein it is heated to a molten condition and is subjected to subatmospheric pressure, i.e. it is passed in molten condition through a section of the extruder wherein volatile ingredients are vaporized and removed from the polymer under vacuum, then is extruded as a thin sheet or a plurality of strands which are cooled and cut to a granular form suitable for molding.

The following examples illustrate ways in which the

EXAMPLE 1

A charge of 1500 grams of a solution, consisting of 10 percent by weight of stereospecific polybutadiene rubber having a Mooney number of 35, which rubber was free of gels, i.e., it was an amorphous polymer, consisting of over 90 percent 1,4-addition polymer and about 7.5 percent 1,2-addition polymer, with from 32 to about 35 percent cis-1,4-configuration and about 65 percent trans-1,4-configuration, dissolved in 90 percent by weight of a mixture of monomers consisting of 26 parts by weight of acrylonitrile and 64 parts by weight of styrene, was placed in a round bottom glass reaction vessel 6 inches in diameter by 10 inches long and equipped with a baffle and stirrer.

The stirrer consisted of a ¾-inch diameter stainless steel shaft having seven ⅜-inch diameter cross-arms 2 inches long spaced 1¼ inches apart along the shaft, the lowermost cross-arm being at the bottom of the shaft to form a flat multi-bar-type agitator or stirrer. The baffle consisted of a two-sided slotted cage fitting within the reactor with the sloted sides being 5/16-inch diameter stainless steel rods spaced 1¼ inches apart throughout its height and positioned in the reactor so that upon rotating the stirrer, the terminal portions of the cross-arms of the stirrer, passed or moved between the 5/16-inch diameter rods or sides of the slotted cage as the stirrer was rotated, to thereby produce a shearing agitation in the mass of the material being stirred in the reactor.

The vessel containing the 1500 grams of the polymerizable solution was heated by immersing the lower portion thereof, in a bath of a heat transfer medium. The stirrer was rotated at a rate of 80 revolutions per minute. The solution was stirred and heated at a temperature of 110° C. in the closed reaction vessel for a period of 4 hours. The product was a partially polymerized or prepolymerized viscous liquid containing 28 percent by weight of solids. The product was a stable dispersion containing the interpolymer in the form of fine particles of a size of 3 microns.

A charge of 400 grams of the partially polymerized viscous liquid containing 28 percent by weight of solids was mixed with 0.02 percent by weight of di-tert.-butyl peroxide as polymerization catalyst. This mixture was placed in a pressure resistant vessel equipped with a stirrer, together with 800 grams of water containing dissolved therein 24 grams of crude sodium carboxymethyl methyl cellulose, consisting of one-third part by weight of sodium carboxymethyl methyl cellulose, a cellulose derivative having an average of 0.25 —OCH$_2$COOH group and 1.8 —OCH$_3$ groups per mole of cellulose, one-third part by weight of sodium chloride and one-third part by weight of water, as dispersing agent. The crude sodium carboxymethyl methyl cellulose had a viscosity of 1700 centipoises as determined for a 2 weight percent solution of the material in water at 25° C. The resulting mixture was stirred to maintain the prepolymerized liquid starting material suspended as droplets in the aqueous medium and was heated in the closed vessel to polymerize the monomer under time and temperature conditions as follows: 4 hours at 130° C.; 4 hours at 140° C.; and 2 hours at 150° C. Thereafter, the vessel was cooled, was opened and the polymer product removed. The product was separated by filtering and was washed with water and dried. Portions of the polymer were compression molded at 420° F. and 700 pounds per square inch gauge pressure. Test bars of ½ x ⅛ x 4 inches long were cut from the molded sheet. These test bars were used to determine tensile strength and elongation values for the product employing procedures similar to those described in ASTM D638–57T. Impact strength was determined by procedure similar to that described in ASTM D256–57T. Other test bars were used to determine a Vicat softening point for the polymer. The polymer product had the properties:

| | |
|---|---|
| Tensile strength lbs./sq. in | 6,080 |
| Elongation percent | 8.9 |
| Notched impact strength ft.-lbs | 3.4 |
| Vicat softening point ° C | 105 |

Molded and extruded articles prepared from the polymer were a white to light tan color, were free from surface blemishes and had a high gloss.

EXAMPLE 2

A polymerizable liquid was prepared by dissolving (a) 10 parts by weight of stereospecific polybutadiene rubber having a Mooney number of 35, consisting of over 90 percent 1,4-addition and about 7.5 percent 1,2-addition structure with from 32 to 35 percent of cis-1,4-configuration and the remainder being trans-1,4-configuration, in (b) 65 parts by weight of monomeric styrene at room temperature and adding thereto (c) 25 parts by weight of monomeric acrylonitrile.

The solution was fed to a polymerization vessel comprising a 2.5 inch diameter stainless steel recirculating coil reactor, equipped with a gear pump for recirculating liquid therethrough, suitable inlets and outlets, and jacket means for passing a heat transfer medium therethrough to control and regulate the temperature of material in the coil, and which coil reactor had a total capacity of 27 pounds of liquid. The coil was substantially filled with about 25 pounds of the polymerizable liquid, after which the inlets and outlets to the coil were closed. The liquid was heated at a temperature of 100° C. and was continuously recirculated in the coil at a rate of three times the volume or capacity of the coil per minute for a period of 8 hours. Thereafter, the partially polymerized liquid was removed from the coil reactor and was cooled. The resulting partially polymerized liquid was a stable homogeneous dispersion of polymer in the form of particles of about 2 microns in size. The dispersion contained 28 percent by weight of solids and did not separate upon standing at room temperature for 30 days.

A charge of 5 pounds of the partially polymerized liquid containing 28 percent by weight of solids was mixed with 0.02 percent by weight of di-tert.-butyl peroxide as polymerization catalyst. This mixture was added to an aqueous solution of 10 pounds of water having dissolved therein 0.6 pound of crude sodium carboxymethyl methyl cellulose consisting of a mixture of about one-third sodium chloride, one-third water and one-third sodium salt of carboxymethyl methyl cellulose, a cellulose derivative having an average of 0.25 —OCH$_2$COOH group and 1.8 —OCH$_3$ groups per mole of cellulose, which crude carboxymethyl methyl cellulose had a viscosity characteristic of 1700 centipoises as determined for a 2 weight percent solution of said material in water at 25° C., as dispersing or suspension agent, in a polymerization vessel equipped with a stirrer and means for heating and cooling the same.

The resulting mixture was stirred to maintain the polymerizable liquid dispersed as droplets in the aqueous medium and was heated in the closed vessel to polymerize the monomers under time and temperature conditions as follows: 4 hours at 130° C.; 4 hours at 140° C.; and 2 hours at 150° C. Thereafter, the material was cooled and was removed from the polymerization vessel. The polymeric product was in the form of discrete rounded particles. It was separated from the aqueous medium by filtering and was washed and dried. The dried product was fed to a plastics extruder wherein it was heated to the molten condition under pressure then was passed through a devolatilization zone in the extruder wherein the molten polymer was subjected to vacuum at an absolute pressure of about 10 millimeters to vaporize and remove volatile ingredients, after which the devolatilized polymer was extruded at a temperature of 180° C. as a plurality of strands which were cooled and cut to a granular form. Portions of the devolatilized polymer were compression molded at a temperature of 420° F. and 700 pounds per square inch gauge pressure to form test plates one-eighth inch thick. Test pieces of ⅛ x ½ inch cross section were cut from the molded polymer plate. These test pieces were used to determined the tensile strength and elongation for the polymer employing procedures similar to those described in ASTM D638–57T. Impact strength was determined by procedure similar to that described in ASTM D256–57T. Other test pieces were used to determine the Vicat softening point, and the percent volatiles. The properties determined for the polymer are reported under A below. For purpose of comparison another portion of the solution of the stereospecific polybutadiene rubber dissolved in the monomeric styrene and acrylonitrile was prepolymerized in the coil reactor to 28 percent by weight of solids, but with agitating of the mixture, i.e. recirculating of the mixture in the coil, at a rate such that a predominant amount of the interpolymer particles in the prepolymerized material were greater than 5 microns and not substantially greater than 10 microns in size. Thereafter, polymerization of the monomer was carried out in aqueous suspension as described above. The properties of this polymer are reported under B below.

suspended in the aqueous medium employing procedure similar to that employed in Example 2. The product was separated, was dried, and was molded and tested employing procedures similar to those employed in said examples. Table I identifies the experiments and the rubber employed to make the compositions. The table also gives the properties determined for the product.

*Table I*

| Run No. | Synthetic Rubber | | Product | | | | | |
|---|---|---|---|---|---|---|---|---|
| | Kind | Mooney Number | Tensile Strength, lbs./sq. in. | Elongation Percent | Modulus ×10⁵, lbs./sq. in. | Notched Impact Strength (ft.-lbs. at— | | Vicat Softening Point, °C. |
| | | | | | | 76° F. | 20° F. | |
| 1 | Polybutadiene ¹ | 35 | 3,620 | 27.8 | 2.3 | 3.41 | 2.16 | 106 |
| 2 | GR–S 1006 ² | 50 | 2,920 | 32.9 | 2.1 | 2.71 | 1.64 | 108 |
| 3 | GR–S ³ | 55 | 3,200 | 28.4 | 2.2 | 2.16 | 1.54 | 108 |
| 4 | GR–S ³ | 35 | 5,200 | 24.6 | 33 | 3.25 | 0.88 | 101 |
| 5 | GR–S ⁴ | 45 | 4,580 | 22.5 | 2.8 | 1.92 | 1.35 | 106 |
| 6 | Polybutadiene ⁵ | 45 | 3,460 | 26.7 | 2.2 | 2.47 | 1.98 | 106 |

¹ An amorphous stereospecific polybutadiene rubber free of gel consisting of over 90 percent 1,4-addition polymer and about 7.5 percent 1,2-addition polymer, with the 1,4-addition polymer consisting of about 65 percent trans-configuration and about 35 percent cis-configuration, and of narrow molecular weight distribution.
² An emulsion hot rubber consisting of a copolymer of approximately 76.5 percent by weight of butadiene and 23.5 percent of styrene.
³ An emulsion cold rubber consisting of a copolymer of approximately 78 percent by weight of butadiene and 22 percent of styrene.
⁴ A stereospecific rubber consisting of a copolymer of about 75 percent by weight of butadiene and about 25 percent of styrene.
⁵ An amorphous stereospecific polybutadiene rubber consisting of approximately 95 percent cis-1,4-addition polymer and having a wide molecular weight distribution.

| | A | B |
|---|---|---|
| Particle size in prepolymer (microns) | 2 | 7–10 |
| Tensile Strength (lbs./sq. in.) | 5,525 | 3,750 |
| Notched Impact Strength | 4.8 | 1.4 |
| Gloss | 78 | 22 |

EXAMPLE 3

In each of a series of experiments, a solution was prepared by dissolving 10 parts by weight of a synthetic rubber as identified in the following table in 65 parts by weight of monomeric styrene at room temperature and adding 25 parts by weight of acrylonitrile thereto. The resulting solution was prepolymerized in a reactor with shearing agitation employing procedure similar to that employed in Example 1, to obtain a partially polymerized liquid containing 28 to 30 percent by weight of solids in the form of fine particles of sizes not greater than 3 microns.

A charge of 400 grams of the partially polymerized solution was mixed with 0.02 percent by weight of di-tert.-butyl peroxide as polymerization catalyst, then was placed in a pressure resistant vessel, together with 800 grams of water containing sodium carboxymethylmethyl cellulose as suspending agent and was polymerized while

EXAMPLE 4

A solution was prepared by mixing 10 parts by weight of polybutadiene rubber having a Mooney number of 35, similar to that employed in Run No. 1 of Example 4, and 4 parts by weight of a rubbery copolymer of 68 percent by weight of butadiene and 32 percent of acrylonitrile, which rubber had a Mooney number ML(1+4) 212° F. of 55, with 63 parts by weight of monomeric styrene and stirring the mixture until the rubber was dissolved. To the solution there was added 23 parts by weight of acrylonitrile and 0.02 percent by weight, based on the total weight of the mixture, of benzoyl peroxide as polymerization catalyst. The resulting mixture was stirred and agitated employing the polymerization vessel employed in Example 1, while rotating the agitator at a rate of 30 r.p.m. and heating the mixture at a temperature of 90° C. for a period of 12 hours. The prepolymerized solution contained about 30 percent by weight of polymer in the form of particles of 5 microns in size. The prepolymerized solution was mixed with 0.02 percent by weight of di-tert.-butyl peroxide as polymerization catalyst, then was suspended in an aqueous medium and the polymerization completed employing procedure similar to that employed in the preceding examples. The product was molded and tested employing procedures similar to those employed in Example 2. The polymer had the properties:

Tensile strength _____lbs./sq. in__ 3600
Elongation _____percent__ 33.9
Notched impact strength _____ft.-lbs__ 4.9
Modulus ×10⁵ _____lbs./sq. in__ 3.1

EXAMPLE 5

In each of a series of experiments, a solution was prepared by dissolving 12 parts by weight of stereospecific polybutadiene rubber, similar to that employed in Example 1, in monomeric styrene and adding thereto acrylonitrile in amount as stated in the following table to form a solution consisting of 12 percent by weight of the polybutadiene rubber dissolved in 88 percent by weight of the mixture of the monomers. The solution was stirred and was heated at a temperature of 110° C. for a period of about 4 hours, and was partially polymerized to contain from 29 to 33 percent by weight of solids in a reaction vessel as described in Example 1, while stirring the mass with shearing agitation by rotating the stirrer at 80 revolutions per minute. The partially polymerized solution was observed for the size of the polymer particles therein, then was further polymerized in an aqueous suspension employing procedure similar to that employed in Example 1, to obtain a solid polymeric product in the form of rounded granules. Portions of the product absorption values were determined by soaking a weighed test piece of the molded product in liquid trichlorofluoromethane at 25° C. for a period of 8 to 24 hours as stated in the table then re-weighing the test piece. The gain in weight divided by the initial weight of the test piece and multiplied by 100 is recorded as the percent solvent absorption.

*Table III*

| Run No. | Starting Materials | | | Prepolymer Solution | | Product | | | | | | |
|---|---|---|---|---|---|---|---|---|---|---|---|---|
| | Styrene, Percent | VCN, Percent | Rubber, Percent | Solids, Percent | Particle Size, Microns | Tensile Strength, lbs./sq. in. | Elongation percent | Notched Impact Strength at— | | Vicat Softening Point, ° C. | Solvent Absorption Trichlorofluoromethane | |
| | | | | | | | | 75° F. | −20° F. | | Percent | Hours |
| 1 | 68 | 26 | 6 | 33.2 | 3 | 6,130 | 1.8 | 0.6 | 0.6 | 98 | 0.3 | 24 |
| 2 | 65 | 25 | 10 | 33.2 | 3 | 4,200 | 8.9 | 3.4 | 3.4 | 105 | 0.5 | 24 |
| 3 | 64 | 24 | 12 | 31.0 | 3 | 3,290 | 3.9 | 7.7 | 4.8 | 115 | 5.0 | 8 |
| 4 | 62 | 24 | 14 | 34.5 | 3 | 2,500 | 6.8 | 12.5 | 7.6 | 108 | 9.7 | 8 |
| 5 | 61 | 23 | 16 | 27.3 | 3 | 2,880 | 26.5 | 9.9 | 6.6 | 110 | 14.3 | 8 | were compression molded and tested to determine the physical properties of the material. Table II identifies the experiments and gives the proportions of styrene, acrylonitrile and polybutadiene employed in making the polymeric product. The table also gives the properties determined for the product.

EXAMPLE 7

In each of a series of experiments, a solution was prepared by dissolving stereospecific polybutadiene rubber, similar to that employed in Example 1, in monomeric styrene and adding thereto acrylonitrile and alpha-methyl

*Table II*

| Run No. | Starting Materials | | | Prepolymer Solution | | Product | | | | | | |
|---|---|---|---|---|---|---|---|---|---|---|---|---|
| | Styrene, percent | VCN, percent | Rubber, percent | Solids, percent | Particle Size, Microns | Tensile Strength, lbs./sq. in. | Elongation, percent | Modulus ×10⁵, lbs./sq. in. | Notched Impact Strength, ft.-lbs. | Heat Distortion Temp., ° C. | Gloss | Color |
| 1 | 60 | 28 | 12 | 29.8 | <1 | 4,910 | 6.8 | 2.9 | 3.6 | 104 | 53 | Yellow. |
| 2 | 61 | 27 | 12 | 30.1 | <1 | 5,750 | 2.3 | 3.5 | 3.7 | 103.5 | 60 | Do. |
| 3 | 62 | 26 | 12 | 29.4 | 3 | 4,290 | 24.9 | 3.0 | 4.0 | 103.5 | 53 | Tan. |
| 4 | 63 | 25 | 12 | 33 | 3 | 3,800 | 17.9 | 3.0 | 4.5 | 100 | 63 | Near white. |
| 5 | 64 | 24 | 12 | 30 | <3 | 4,830 | 7.3 | 2.9 | 3.6 | 99 | 65 | Yellow. |
| 6 | 65 | 23 | 12 | 29 | <1 | 4,430 | 7.8 | 3.3 | 4.4 | 107 | 62 | Tan. |

EXAMPLE 6

In each of a series of experiments, a solution was prepared by dissolving a quantity of stereospecific polybutadiene rubber, similar to that employed in Example 1, in monomeric styrene and adding thereto acrylonitrile in amount to form a solution containing the rubber, the styrene and the acrylonitrile in proportions as stated in the following table. The solution was stirred and heated at a temperature of 80° C. for a period of 4 hours and was partially polymerized to contain an amount of solids as stated in the following table, in a reaction vessel similar to that employed in Example 1, while stirring the mass with shearing agitation by rotating the stirrer at a speed of 80 revolutions per minute to form a prepolymer mixture containing the polymer in the form of particles of sizes three microns or smaller. The partially polymerized solution was further polymerized by heating it while suspended in an aqueous medium employing procedure similar to that employed in Example 1, to obtain the product in the form of solid particles. Portions of the polymeric product were compression molded to form test pieces. The test pieces were used to determine the properties for the product. Table III identifies the experiments and gives the proportion of the styrene, the acrylonitrile and the rubber used in preparing the polymer. The table also gives the properties determined for the product. In the table the solvent styrene in amounts to form a solution containing 12 percent by weight of the rubber, acrylonitrile, styrene and alpha-methylstyrene in proportions as stated in the following table. The solution was stirred and heated at a temperature of 110° C. in a two gallon capacity reaction vessel equipped with an agitator and baffle for producing a shearing agitation on the material while continuing the polymerization of the monomers until the solution contained about 30 percent by weight of solids, then was cooled to room temperature. The solution was a stable viscous liquid containing the polymer in the form of fine particles of sizes not greater than 3 microns. The prepolymerized solution was suspended in twice its volume of an aqueous medium containing sodium carboxymethyl methyl cellulose as dispersing agent and was polymerized in the closed vessel, after pressurizing under 50 pounds per square inch guage pressure of nitrogen gas at room temperature, by heating the aqueous suspension under time and temperature conditions similar to those employed in Example 1. The product was obtained in the form of rounded particles. Portions of the product were compression molded to form test plates for determining the properties of the molded product. Table IV identifies the experiments and gives the proportions of the polybutadiene rubber, the acrylonitrile, the styrene and the alpha-methylstyrene employed in making the polymer. The table also gives the properties determined for the product.

Table IV

| Run No. | Starting Materials ||||  Polymer Solution || Product |||||
|---|---|---|---|---|---|---|---|---|---|---|---|
| | Styrene, Percent | VCN, Percent | Alpha, Methyl Styrene, Percent | Rubber, Percent | Solids, Percent | Particle Size, Microns | Tensile Strength, lbs./sq. in. | Elongation, Percent | Notched Impact Strength, ft.-lbs. | Gloss | Color |
| 1 | 57 | 26 | 5  | 12 | 29.5 | 3 | 4,150 | 19.1 | 3.7 | 33 | Off White. |
| 2 | 52 | 26 | 10 | 12 | 29.6 | 3 | 5,050 | 33.2 | 2.4 | 14 | Do. |
| 3 | 42 | 26 | 20 | 12 | 29   | 3 | 3,280 | 17.5 | 2.2 | 29 | Do. |
| 4 | 59 | 24 | 5  | 12 | 30.5 | 1 | 5,290 | 14.5 | 3.2 | 41 | Do. |
| 5 | 54 | 24 | 10 | 12 | 31   | 2 | 5,210 | 27.4 | 2.5 | 53 | Do. |
| 6 | 44 | 24 | 20 | 12 | 29.7 |   | 2,940 | 20.9 | 2.1 | 37 | Do. |

EXAMPLE 8

In each of a series experiments, a solution was prepared by dissolving a quantity of stereospecific polybutadiene rubber, similar to that employed in Example 1, in ortho-vinyltoluene and adding acrylonitrile thereto to form a solution containing the ingredients in proportions as stated in the following table. The solution was mixed with 0.03 percent by weight of benzoyl peroxide as polymerization catalyst and was partially polymerized by heating the same at a temperature of 80° C. in a polymerization vessel similar to that employed in Example 1 and rotating the stirrer at a rate of 60 revolutions per minute. The solution was observed and analyzed to determine the size of the polymer particles therein and the percent by weight of solids. The partially polymerized solution was suspended in twice its volume of an aqueous solution containing sodium carboxymethyl methyl cellulose as dispersing agent and was heated and stirred in a closed vessel under time and temperature conditions as follows: 4 hours at 130° C.; 4 hours at 140° C.; and 2 hours at 150° C. to polymerize the remaining monomer. Thereafter, the polymer in the form of rounded granules was separated from the aqueous medium by filtering and was washed with water and dried. Portions of the polymer were compression molded to form flat sheets from which test bars were cut and used to determine the properties of the polymer. Table V identifies the experiments, and gives the proportions of orthovinyltoluene, acrylonitrile and polybutadiene rubber employed in making the polymer. The table also gives the properties determined for the product.

polybutadiene rubber consisting of over 90 percent 1,4-addition polymer and containing between 32 and 35 percent of cis-1,4-addition polymer and having a narrow molecular weight distribution, which polybutadiene rubber had a Mooney number of 35, in 65 parts by weight of a monovinyl aromatic compound as identified in the following table, and adding thereto 25 parts by weight of acrylonitrile. The solution was stirred and heated at a temperature of 110° C. in a two gallon capacity reaction vessel similar to that employed in Example 6 until the mixture contained approximately 30 percent of polymer. A charge of 5 pounds of the partially polymerized mixture was suspended in 7.5 pounds of water containing 2.5 percent by weight of crude sodium carboxymethyl cellulose (33 percent active) similar to that employed in Example 1, and 0.2 percent by weight, based on the weight of the partially polymerized mixture, of 2,6-di-tert.-butyl-4-methylphenol was added, together with 0.02 percent by weight of di-tert.-butyl peroxide as polymerization catalyst. The suspension was stirred and heated in a three gallon capacity closed vessel under time and temperature conditions as follows: 3 hours at 130° C.; 3 hours at 140° C.; and 2 hours at 150° C., to complete polymerization of the monomers. The product in the form of solid particles was separated by filtering, was washed with water and was dried. Portions of the product were molded and tested to determine the properties of the product. Table VI identifies the experiments and names the vinyl aromatic compounds or monomer employed in making the vinyl aromatic-acrylonitrile-rubber composition. The table also gives the prepolymerization

Table V

| Run No. | Starting Materials ||| Prepolymer Solution || Product |||||
|---|---|---|---|---|---|---|---|---|---|---|---|
| | Ortho-Vinyl-Toluene, Percent | VCN, Percent | Rubber, Percent | Solids, Percent | Particle Size, Microns | Yield Tensile Strength, lbs./sq. in. | Elongation, Percent | Impact Strength (ft.-lbs.) at— || Modulus ×10⁵, lbs./sq. in. | Vicat Softening Point, °C. |
| | | | | | | | | 75° F. | −20° F. | | |
| 1 | 68 | 26 | 6  | 49.8 | 3 | 4,990 | 2   | 1.5 | 0.9 | 3.5 | 116 |
| 2 | 67 | 26 | 7  | 46.3 | 3 | 4,520 | 2.1 | 1.3 | 0.9 | 3.0 | 113 |
| 3 | 65 | 25 | 10 | 37.5 | 3 | 3,030 | 5.6 | 1.3 | 1.2 | 5.6 | 113 |

EXAMPLE 9

In each of a series of experiments, a solution was prepared by dissolving 10 parts by weight of stereospecific time and the size of the polymer particles in the partially polymerized mixture. The table gives the properties determined for the polymer product.

Table VI

| Run No. | Monomer Vinyl Aromatic Compound | Prepolymerizing Conditions | | Prepolymer Solution | | Product | | | | |
|---|---|---|---|---|---|---|---|---|---|---|
| | | Temp., °C. | Time, Min. | Solids, Percent | Particle Size, Microns | Tensile Strength, lbs./sq. in. | Elongation, Percent | Modulus ×10⁵, lbs./sq. in. | Notched Impact Strength, ft.-lbs. | Vicat Softening Point, °C. |
| 1 | Styrene | 110 | 175 | 28.2 | 3 | 4,190 | 1.8 | 3.6 | 2.2 | 91 |
| 2 | p-Chlorostyrene | 110 | 155 | 30 | 3-4 | 4,040 | 5.0 | 2.8 | 2.8 | 111 |
| 3 | 65% Meta- and 35% Para-vinyltoluenes. | 110 | 135 | 29.2 | 3 | 3,540 | 2.0 | 2.5 | 5.1 | 80 |
| 4 | Ortho-vinyltoluene | 110 | 75 | 28.8 | 5 | 2,530 | 19.4 | 2.7 | 4.5 | 85 |

EXAMPLE 10

In each of a series of experiments, a solution was prepared by dissolving a stereospecific polybutadiene rubber having a Mooney number of 35, which polybutadiene consisted of over 90 percent 1,4-addition and about 7.5 percent 1,2-addition structure, with the cis-1,4-configuration comprising from 32 to 35 percent of the polymer, and which polybutadiene had a narrow molecular weight distribution, in monomeric styrene and adding thereto an acrylonitrile, in proportions as stated in the following table. The solution was prepolymerized or partially polymerized by stirring and heating the same in mass, employing an arrangement of apparatus similar to that employed in Example 1 until the solution contained from 28 to 30 percent by weight of polymer. The partially polymerized liquid was placed in a pressure resistant vessel, together with water containing a dispersing agent similar to that employed in Example 1. Polymerization of the monomer was continued while having the liquid suspended in the aqueous medium until substantially complete, employing procedure similar to that employed in Example 1. The product was recovered in the form of a rounded granules and was washed with water and dried. The dried polymer was fed to a plastics extruder wherein it was pressed and heated to a molten condition and was passed through a devolatilization zone in the extruder wherein the molten polymer was subjected to vacuum at an absolute pressure of about 10 millimeters to vaporize and remove volatile ingredients, after which the devolatilized polymer was extruded at a temperature of about 180° C. as a plurality of strands which were cooled and cut to a granular form suitable for molding. Portions of the polymer were compression molded at a temperature of 420° F. and 700 pounds per square inch gauge pressure to form test plates one-eighth inch thick. Test pieces were cut from the molded plate and were used to determine the properties for the polymer. Table VII identifies the experiments and gives the proportions of the ingredients in the starting materials. The table also gives the percent of solids in the prepolymerized liquid material. The table gives the properties determined for the product or polymer. The experiments define substantially the area defined by the lines ABCDE of the drawing.

The area defined by the lines ABCDE of the drawing encompass the polymeric products obtained by polymerization of mixtures of ingredients in proportions as set out in the above Table VII. Similar results are obtained when other synthetic butadiene rubbers such as cis-4-polybutadiene (a stereospecific polybutadiene containing 90 percent or more of polymer having the cis-1,4-configuration), GR–S 1006, an emulsion copolymer of about 76.5 percent by weight of butadiene and about 23.5 percent of styrene, or a stereospecific copolymer of about 75 percent by weight of butadiene and 25 percent of styrene, or in general, soluble homopolymers and copolymers containing from 70 to 100 percent by weight of butadiene and correspondingly from 30 to 0 percent of styrene in chemically combined form, are substituted for the polybutadiene rubber employed in the experiments. Similar results are also obtained when other vinyl aromatic compounds such as vinyltoluene, vinylxylene, ethylvinylbenzene, isopropylstyrene, tert.-butylstyrene, chlorostyrene, dichlorostyrene, fluorostyrene, bromostyrene, or ar-chlorovinyltoluene are substituted for the styrene used in the experiments.

I claim:

1. A process for making a thermoplastic composition of matter consisting essentially of an interpolymerization product which comprises: (1) heating a solution of from 5 to 16 percent by weight of rubbery butadiene polymer that is soluble in monomeric styrene and contains a predominant amount of butadiene-1,3 chemically combined in the polymer molecule, dissolved in (a) from 55 to 70 percent by weight, based on the weight of the solution, of a polymerizable liquid comprising at least one alkenyl aromatic compound having the general formula $$Ar\!-\!CR\!=\!CH_2$$

wherein Ar represents an aromatic radical selected from the group consisting of hydrocarbon and nuclear substituted halohydrocarbon radicals of the benzene series, and R is a member of the group consisting of hydrogen and alkyl radicals containing from 1 to 2 carbon atoms with the proviso that at least 75 percent by weight of said alkenyl aromatic compound is a monovinyl aromatic compound having the general formula $Ar\!-\!CH\!=\!CH_2$ wherein Ar has the meaning given above, and (b) from 20 to 30 percent by weight, based on the weight of the solution of an unsaturated nitrile selected from the group consisting of acrylonitrile and methacrylonitrile, at temperatures between 60° and 150° C., while (2) subjecting the solution to shearing agitation sufficient to maintain the polymer dispersed in the liquid in the form of particles Table VII

| Run No. | Starting Materials | | | Prepolymer Solution, Solids, Percent | Product | | | | |
|---|---|---|---|---|---|---|---|---|---|
| | Styrene, Percent | VCN, Percent | Rubber, Percent | | Tensile Strength, lbs./sq. in. | Elongation, Percent | Modulus ×10⁵, lbs./sq. in. | Notched Impact Strength, ft.-lbs. | Vicat Softening Point, °C. |
| 1 | 56 | 30 | 14 | 24.5 | 4,852 | 41.6 | 2.8 | 10.1 | 109 |
| 2 | 61 | 23 | 16 | 27.3 | 2,880 | 26.5 | | 9.9 | 110 |
| 3 | 70 | 20 | 10 | 27 | 3,240 | 50.0 | 2.6 | 2.3 | 103 |
| 4 | 70 | 25 | 5 | 20 | 3,900 | 23.4 | 2.7 | 1.7 | 96 |
| 5 | 65 | 30 | 5 | 20 | 4,740 | 16.3 | 3.3 | 1.6 | 94 | of sizes not greater than 5 microns, and until the liquid contains from 20 to 50 percent by weight of polymer, then (3) continuing the polymerization of the remaining monomer by heating and agitating the partially polymerized solution while in admixture with, and suspended as droplets in, an inert aqueous medium containing from 0.2 to 5 percent by weight of an alkali metal salt of carboxymethyl methyl cellulose having an average of about 0.25 —OCH$_2$COOH group and about 1.8 OCH$_3$ groups per mole of cellulose as a dispersing agent until said monomer is substantially completely polymerized.

2. A process as in claim 1, wherein the butadiene polymer is polybutadiene.

3. A process as in claim 2, wherein the polybutadiene is stereospecific polybutadiene having at least 30 percent of the polymer in the cis-1,4-configuration.

4. A process as in claim 3, wherein the stereospecific polybutadiene consists of at least 90 percent of 1,4-polymer of which from 32 to 35 percent is of cis-1,4-configuration and said polybutadiene has a narrow molecular weight distribution.

5. A process as in claim 1 wherein the butadiene polymer is a stereospecific copolymer of butadiene and styrene.

6. A process for making a thermoplastic composition of matter consisting essentially of an interpolymerization product which comprises: (1) heating a solution of from 5 to 16 percent by weight of stereospecific polybutadiene consisting principally of 1,4-addition polymer that is soluble in monomeric styrene, dissolved in (a) from 55 to 70 percent by weight, based on the weight of the solution, of styrene, and (b) from 20 to 30 percent by weight, based on the weight of the solution, of acrylonitrile, at temperatures between 80° and 120° C., while (2) subjecting the solution to shearing agitation sufficient to maintain the polymer dispersed in the liquid in the form of particles of sizes not greater than 5 microns, and until the liquid contains from 25 to 35 percent by weight of polymer, then (3) continuing polymerization of the remaining monomer by heating and agitating the partially polymerized solution while in admixture with, and suspended as droplets in, an inert aqueous medium containing from 0.2 to 5 percent by weight of an alkali metal salt of carboxymethyl methyl cellulose having an average of about 0.25 —OCH$_2$COOH group and about 1.8 OCH$_3$ groups per mole of cellulose as a dispersing agent until said monomer is substantially completely polymerized.

7. A process as in claim 6, wherein the dispersing agent is the sodium salt of carboxymethyl methyl cellulose containing about 0.25 —OCH$_2$COOH group and about 1.8 —OCH$_3$ groups per mole of cellulose.

8. A process as in claim 6, wherein the polymerization of the partially polymerized solution is carried out in the aqueous suspension at temperatures between 80° and 180° C.

References Cited by the Examiner

UNITED STATES PATENTS

| | | | |
|---|---|---|---|
| 2,694,692 | 11/1954 | Amos et al. | 260—880 |
| 2,820,773 | 1/1958 | Childers et al. | 260—880 |
| 2,862,906 | 12/1958 | Stein et al. | 260—880 |
| 3,047,534 | 7/1962 | Dyer et al. | 260—880 |
| 3,129,199 | 4/1964 | Lunk | 260—880 |

FOREIGN PATENTS

| | | |
|---|---|---|
| 549,446 | 11/1957 | Canada. |
| 1,273,982 | 9/1961 | France. |

MURRAY TILLMAN, *Primary Examiner.*

GEORGE F. LESMES, *Assistant Examiner.*